United States Patent
Irie

(10) Patent No.: US 10,033,466 B2
(45) Date of Patent: Jul. 24, 2018

(54) OPTICAL TRANSMISSION DEVICE AND WAVELENGTH DIVISION MULTIPLEXING OPTICAL TRANSMISSION DEVICE

(71) Applicant: FUJITSU LIMITED, Kawasaki-shi, Kanagawa (JP)

(72) Inventor: Hiroyuki Irie, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/664,159

(22) Filed: Jul. 31, 2017

(65) Prior Publication Data

US 2018/0041285 A1 Feb. 8, 2018

(30) Foreign Application Priority Data

Aug. 4, 2016 (JP) .................................. 2016-153887

(51) Int. Cl.
*H04J 14/06* (2006.01)
*H04B 10/516* (2013.01)
*H04J 14/02* (2006.01)

(52) U.S. Cl.
CPC ............ *H04B 10/516* (2013.01); *H04J 14/02* (2013.01); *H04J 14/06* (2013.01)

(58) Field of Classification Search
CPC ...... H04J 14/06; H04J 14/02; H04B 10/5053; H04B 10/532; H04B 10/506; G02F 2001/212

(Continued)

(56) References Cited

U.S. PATENT DOCUMENTS

2008/0075463 A1* 3/2008 Nakamoto ......... H04B 10/2557
398/79
2011/0026935 A1* 2/2011 Akiyama ........... H04B 10/5053
398/184

(Continued)

FOREIGN PATENT DOCUMENTS

EP 2521293 A1 11/2012
JP 2013-228676 A 11/2013

(Continued)

OTHER PUBLICATIONS

Brandon C. Collings et al., Nonlinear Polarization Evolution Induced by Cross-Phase Modulation and Its Impact on Transmission Systems, IEEE Photonics Technology Letters, vol. 12, No. 11, Nov. 2000 (Total: 3pages).

(Continued)

*Primary Examiner* — Don N Vo
(74) *Attorney, Agent, or Firm* — Fujitsu Patent Center

(57) ABSTRACT

A signal processing circuit generates first to fourth drive signals to which first to fourth fixed pattern are respectively added. An optical modulators generate a first polarization multiplexed optical signal of a first wavelength from the first and second drive signals and a second polarization multiplexed optical signal of a second wavelength from the third and fourth drive signals. The first to third fixed patterns are the same as one another, and a value of each bit of the fourth fixed pattern is inverted with respect to a value of a corresponding bit of the third fixed pattern. The signal processing circuit generates the first to fourth drive signals such that the first to fourth fixed patterns are transmitted at the same or approximately the same time by the first polarization multiplexed optical signal and the second polarization multiplexed optical signal.

9 Claims, 12 Drawing Sheets

(58) Field of Classification Search
USPC .......................................................... 398/65
See application file for complete search history.

(56) References Cited

U.S. PATENT DOCUMENTS

| | | |
|---|---|---|
| 2013/0259480 A1 | 10/2013 | Oyama et al. |
| 2015/0188637 A1* | 7/2015 | Tanimura ............. H04B 10/532 |
| | | 398/184 |
| 2017/0041067 A1 | 2/2017 | Goto et al. |
| 2017/0070313 A1* | 3/2017 | Kato ................... H04J 14/0204 |
| 2017/0237500 A1* | 8/2017 | Nishimoto ............. G08C 23/04 |
| | | 398/184 |

FOREIGN PATENT DOCUMENTS

| | | |
|---|---|---|
| WO | 2015/141658 A1 | 9/2015 |
| WO | 2015/170558 A1 | 11/2015 |

OTHER PUBLICATIONS

EESR—The Extended European Search Report of European Patent Application No. 17184018.4 dated Dec. 22, 2017.

* cited by examiner

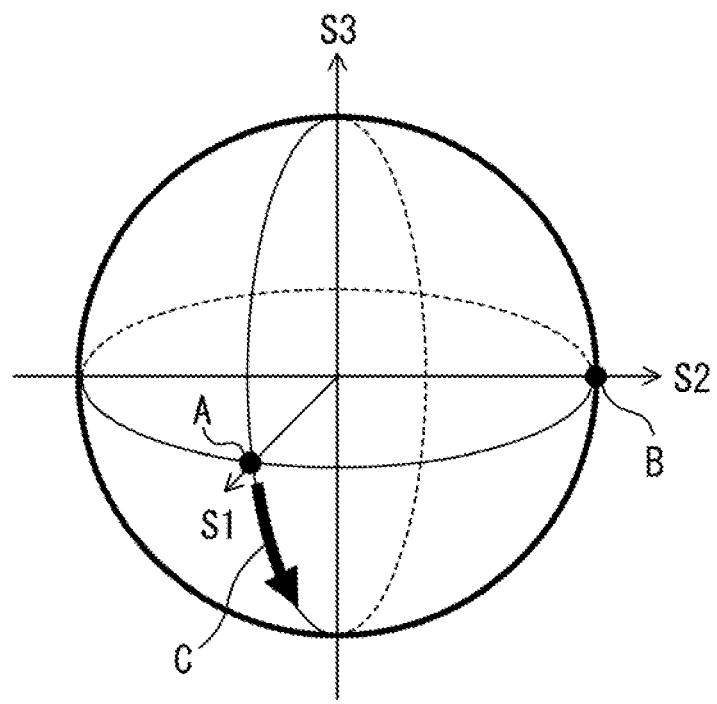
F I G. 3A
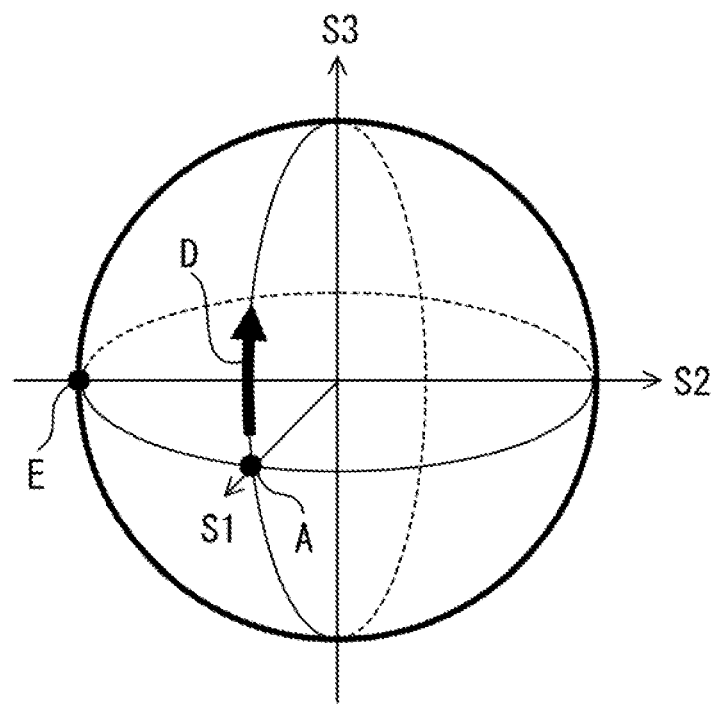
F I G. 3B

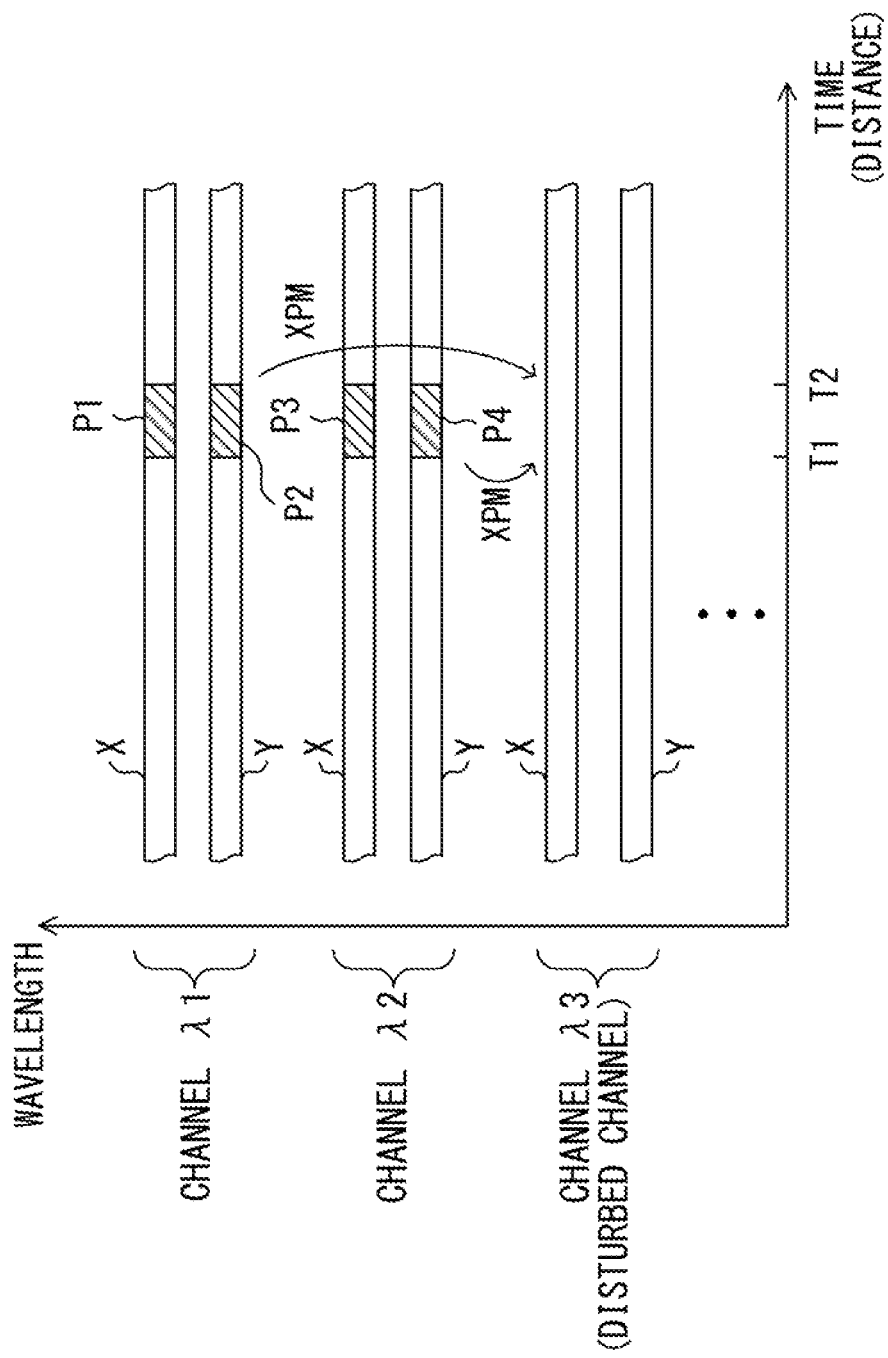
F I G. 4

| P1 | 1 | 0 | 1 | 1 |

| P2 | 1 | 0 | 1 | 1 |

| P3 | 1 | 0 | 1 | 1 |

| P4 | 0 | 1 | 0 | 0 |

F I G. 5

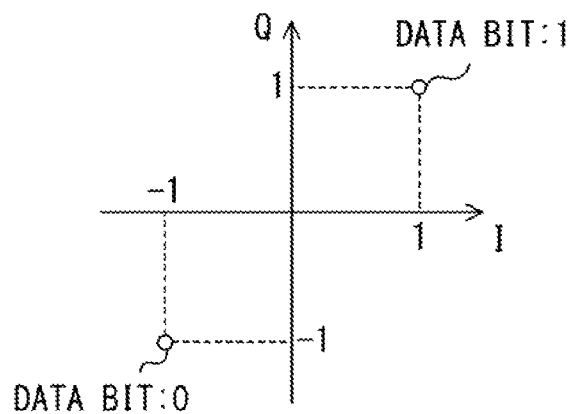
F I G. 6 A
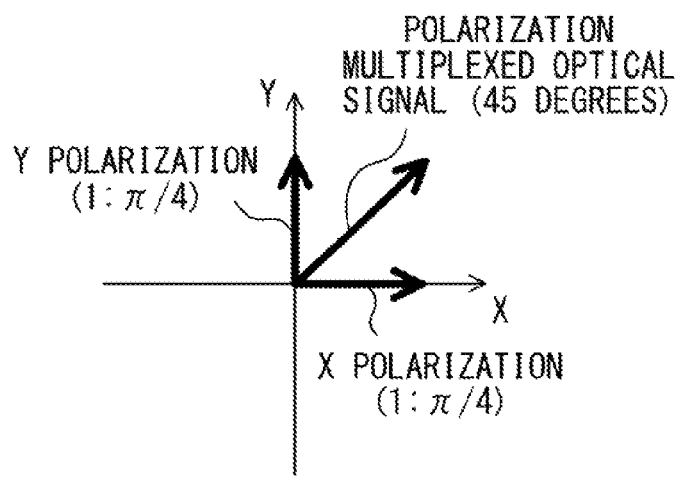
F I G. 6 B
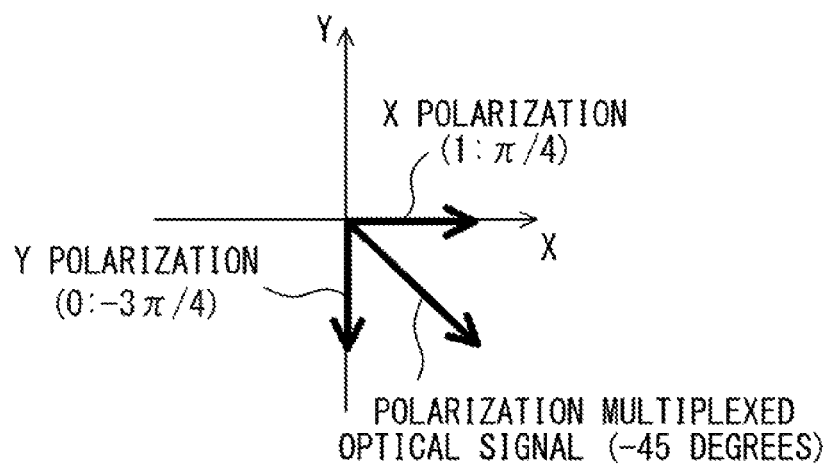
F I G. 6 C

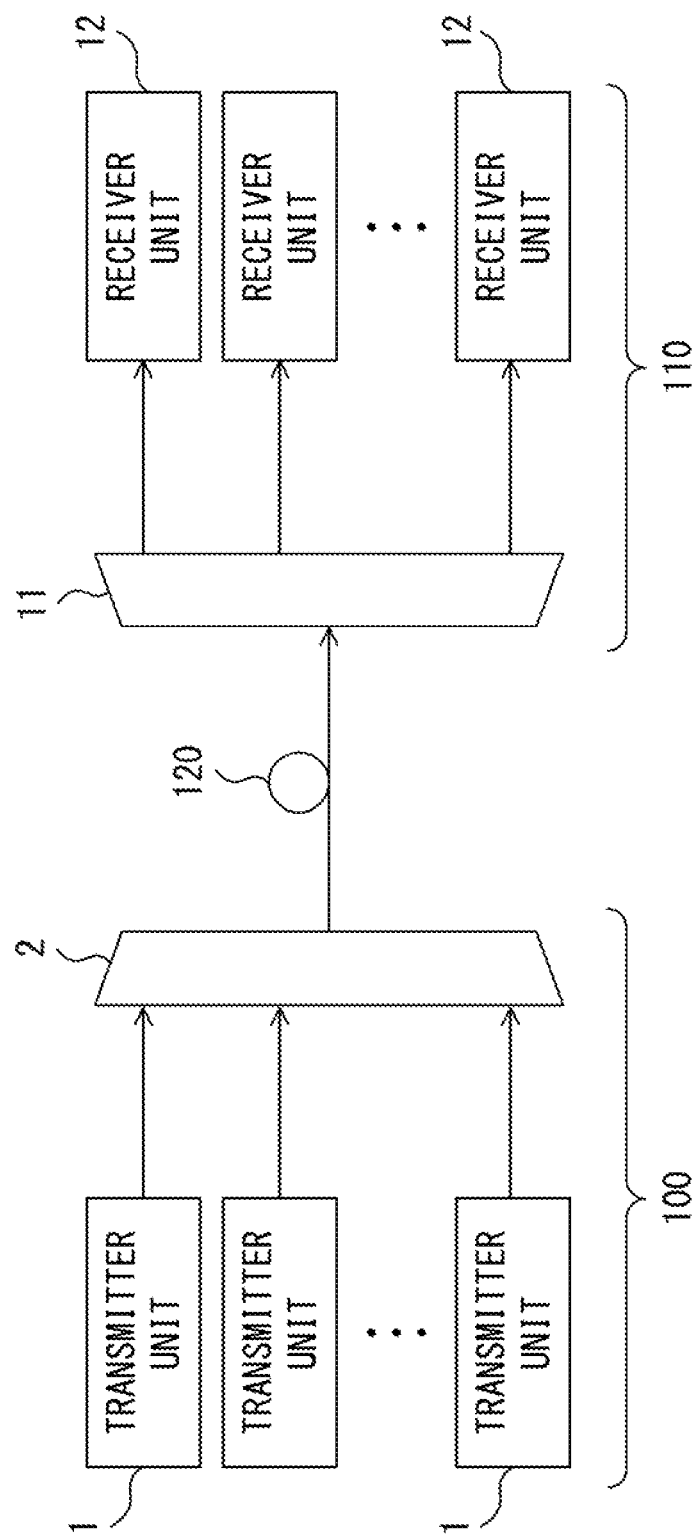
F I G. 7

OPTICAL TRANSMISSION DEVICE AND WAVELENGTH DIVISION MULTIPLEXING OPTICAL TRANSMISSION DEVICE

CROSS-REFERENCE TO RELATED APPLICATION

This application is based upon and claims the benefit of priority of the prior Japanese Patent Application No. 2016-153887, filed on Aug. 4, 2016, the entire contents of which are incorporated herein by reference.

FIELD

The embodiments discussed herein are related to an optical transmission device that transmits a polarization multiplexed optical signal and a wavelength division multiplexing optical transmission device.

BACKGROUND

In order to realize a transmission of large volumes of data in an optical transmission system, wavelength division multiplexing (WDM) has been put to practical use. The WDM can transmit data using a plurality of optical signals of different wavelengths. In other words, the WDM can transmit data using a plurality of wavelength channels.

As a technology to increase a capacity of each wavelength channel, polarization multiplexing has been put to practical use. The polarization multiplexing transmits a signal using a set of polarizations that are orthogonal to each other. In the following descriptions, the set of polarizations that are orthogonal to each other may be referred to as an X polarization and a Y polarization. Further, optical signals that are transmitted using the X polarization and the Y polarization may be respectively referred to as an X-polarization optical signal and a Y-polarization optical signal.

When a frame is transmitted in an optical transmission system, a fixed pattern region may be added to the beginning of each frame. The fixed pattern region is set by a transmitter in a frame header. A receiver can establish a frame synchronization by detecting a fixed pattern region from a received optical signal. Further, the receiver can estimate the characteristics (such as a dispersion) of an optical transmission link according to electric field information of the detected fixed pattern region.

In a polarization multiplexing optical transmission system, fixed pattern regions are inserted into an X-polarization optical signal and a Y-polarization optical signal at the same timing, as illustrated in FIG. 1. Here, a bit string of the fixed pattern region inserted into the X-polarization optical signal and a bit string of the fixed pattern region inserted into the Y-polarization optical signal are the same as each other. Thus, when the X-polarization optical signal and the Y-polarization optical signal are multiplexed, electric field information of the fixed pattern region are combined and a single polarization state is generated. In other words, a single polarization state is generated during a period of time in which a fixed pattern region is transmitted (such as 10 ns). The receiver receives the fixed pattern region in a single polarization state, so the receiver can easily detect the fixed pattern region (that is, to establish a frame synchronization) and estimate a dispersion even when an optical signal is affected by noise in an optical transmission link.

As a related technology, a method for pre-equalizing a cross-phase modulation (XPM) in an optical transmission link is proposed (for example, Japanese Laid-open Patent Publication No. 2013-228676). Further, a method for reducing non-linear optical effects that occur between channels so as to suppress a degradation in signal quality at a reception end in an optical transmission system that transmits a plurality of channels is proposed (for example, International Publication Pamphlet No. WO2015/170558). Further, in the following document, a nonlinear polarization variation due to a cross-phase modulation in a WDM transmission system is discussed. Brandon C. Collings and Luc Boivin, Nonlinear Polarization Evolution Induced by Cross-Phase Modulation and Its Impact on Transmission Systems, IEEE PHOTONICS TECHNOLOGY LETTERS, VOL. 12, NO. 11, November 2000

As described above, a frame synchronization, a dispersion estimation, and the like are realized by adding a fixed pattern region to each frame. However, in a WDM transmission system, a polarization state of a certain wavelength channel affects a polarization state of another wavelength channel due to a cross-phase modulation (XPM). Specifically, when a certain wavelength channel transmits a polarization multiplexed optical signal, a fixed pattern region in a signal polarization state may cause a polarization variation in another wavelength channel. In the example illustrated in FIG. 1, a polarization state of a wavelength channel $\lambda 3$ is disturbed when a fixed pattern region is transmitted in a wavelength channel $\lambda 1$ during a period of time T1-T2.

During a period of time in which a fixed pattern region is transmitted in an adjacent channel (the wavelength channel $\lambda 1$ in FIG. 1), a bit error may occur frequently in a disturbed channel (the wavelength channel $\lambda 3$ in FIG. 1). In other words, a burst error may occur. If the bit error rate goes beyond the FEC capabilities, the receiver will not recover data correctly.

SUMMARY

According to an aspect of the embodiments, an optical transmission device is used in a wavelength division multiplexing optical transmission system. The optical transmission device includes: a signal processing circuit configured to generate a first drive signal to which a first fixed pattern is added, a second drive signal to which a second fixed pattern is added, a third drive signal to which a third fixed pattern is added, and a fourth drive signal to which a fourth fixed pattern is added; a first optical modulator configured to generate a first optical signal based on the first drive signal, generate a second optical signal based on the second drive signal, and combine the first optical signal and the second optical signal so as to generate a first polarization multiplexed optical signal of a first wavelength; a second optical modulator configured to generate a third optical signal based on the third drive signal, generate a fourth optical signal based on the fourth drive signal, and combine the third optical signal and the fourth optical signal so as to generate a second polarization multiplexed optical signal of a second wavelength; and a combiner configured to combine the first polarization multiplexed optical signal and the second polarization multiplexed optical signal. The first fixed pattern and the second fixed pattern are determined such that a phase of the first optical signal generated based on the first fixed pattern matches or approximately matches a phase of the second optical signal generated based on the second fixed pattern. The third fixed pattern and the fourth fixed pattern are determined such that a phase of the third optical signal generated based on the third fixed pattern is inverted or approximately inverted with respect to a phase of the fourth optical signal generated based on the fourth fixed pattern.

The signal processing circuit generates the first drive signal, the second drive signal, the third drive signal, and the fourth drive signal such that the first fixed pattern, the second fixed pattern, the third fixed pattern, and the fourth fixed pattern are transmitted at the same or approximately the same time by the first polarization multiplexed optical signal and the second polarization multiplexed optical signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 3A and 3B illustrate polarization variations using the Poincare sphere;

FIG. 4 illustrates an example of an XPM cancellation according to embodiments of the present invention;

FIG. 5 illustrates examples of fixed patterns used in a wavelength channel pair;

FIGS. 6A-6C illustrate examples of a relationship between a fixed pattern transmitted by an optical signal and a polarization state;

FIG. 7 illustrates an example of a WDM transmission system;

DESCRIPTION OF EMBODIMENTS

Figure 1:
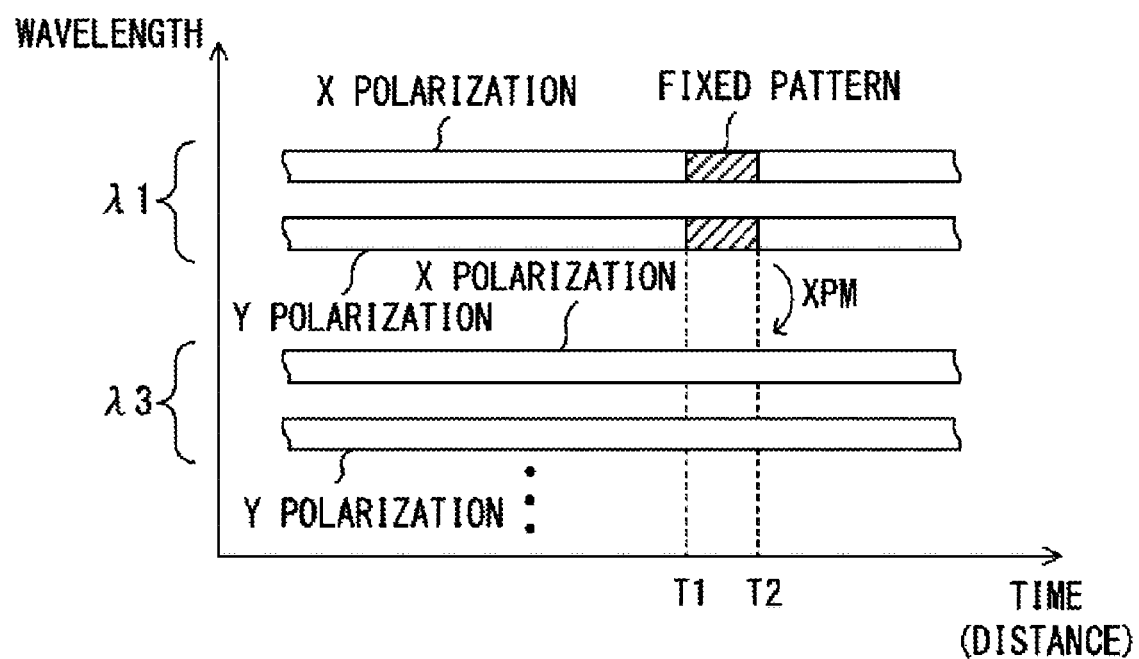
FIG. 1 is a diagram that explains an XPM between wavelength channels.
Figure 2:
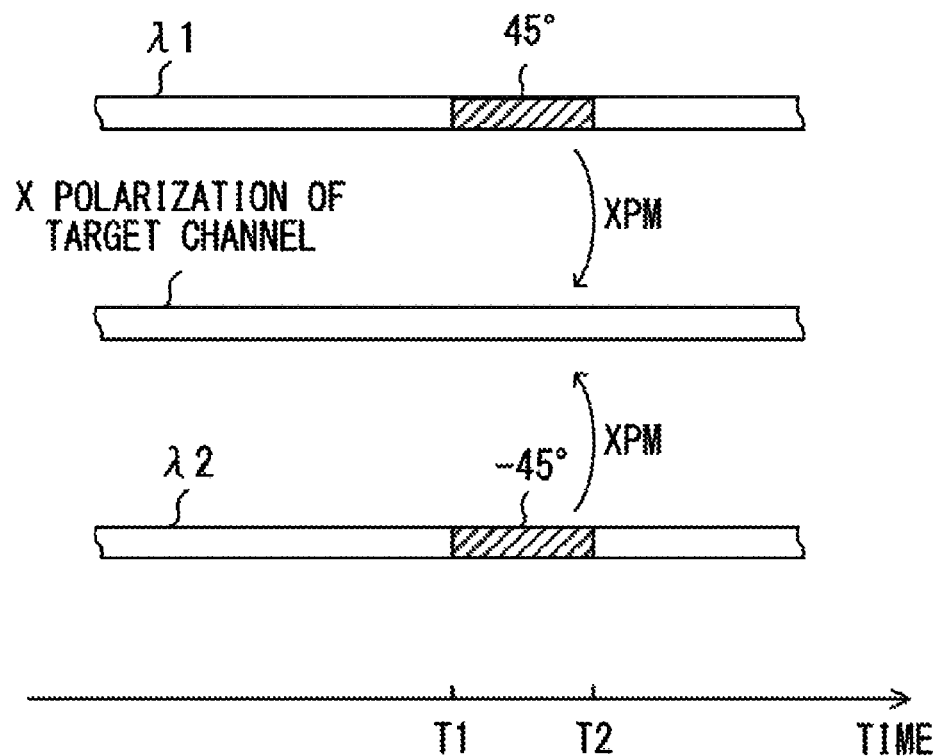
FIG. 2 illustrates an example of a polarization variation due to XPM.

An optical transmission device according to embodiments of the present invention is used in a WDM transmission system. The optical transmission device has a function that suppresses a polarization variation due to an XPM between wavelength channels. Thus, the polarization variation due to an XPM is briefly described before a configuration and an operation of the optical transmission device according to the embodiments of the present invention are described. As an example, a polarization variation of an X-polarization optical signal of a target channel illustrated in FIG. 2 is discussed.

It is assumed that the X-polarization optical signal of the target channel is linear polarization. Further, it is assumed that Stokes parameters S1, S2, S3 of the X-polarization optical signal of the target channel are represented by "1,0,0". In this case, the polarization state of the X-polarization optical signal of the target channel is represented by a point A illustrated in FIG. 3A on the Poincare sphere. In this example, X-polarization is represented by "0 degrees", and Y-polarization is represented by "90 degrees".

It is assumed that a polarization direction of an adjacent channel λ1 is 45 degrees during a period of time T1-T2. In this case, Stokes parameters of the adjacent channel λ1 are represented by "0,1,0". In other words, the polarization state of the adjacent channel λ1 is represented by a point B illustrated in FIG. 3A on the Poincare sphere. When amplitudes of an X polarization and a Y polarization of a polarization multiplexed optical signal are the same as each other and when optical phases of the X polarization and the Y polarization are the same as each other, a polarization direction of the polarization multiplexed optical signal is 45 degrees.

When the target channel and the adjacent channel λ1 are multiplexed, the polarization state of the X-polarization optical signal of the target channel is affected by the polarization state of the adjacent channel λ1. Specifically, the polarization state of the X-polarization optical signal of the target channel is shifted in a direction toward the south pole from the point A (a left-handed circular polarization) during the period of time T1-T2, as indicated by an arrow C in FIG. 3A. As a result, a bit error is more likely to occur in the X-polarization optical signal of the target channel.

This problem may be solved by generating a polarization variation that cancels a polarization variation due to the adjacent channel λ1. Specifically, as illustrated in FIG. 3B, the polarization variation due to the adjacent channel λ1 may be canceled out by giving a polarization variation indicated by an arrow D to the X-polarization optical signal of the target channel.

In FIG. 3B, when the polarization state of the X-polarization optical signal of the target channel is represented by the point A, the polarization state of the X-polarization optical signal of the target channel will be shifted in a direction toward the north pole from the point A (a right-handed circular polarization) if an optical signal in a polarization state represented by a point E is generated. Here, the point E (Stokes parameters="0,−1,0") represents a state in which a polarization direction is −45 degrees (or 135 degrees). Thus, if a polarization direction of an optical signal transmitted through an adjacent channel λ2 is controlled at −45 degrees during the period of time T1-T2, the polarization variation due to the adjacent channel λ1 and a polarization variation due to the adjacent channel λ2 will be canceled out. In other words, a polarization variation of the target channel will be canceled out or suppressed.

Thus, the optical transmission device according to the embodiments of the present invention controls a polarization state of a set of wavelength channels. Specifically, polarization states of a first wavelength channel and a second wavelength channel are controlled such that a polarization variation of a target channel due to the first wavelength channel (adjacent channel λ1 in FIG. 2) and the polarization variation of the target channel due to the second wavelength channel (adjacent channel λ2 in FIG. 2) are canceled out.

FIG. 4 illustrates an example of an XPM cancellation according to the embodiments of the present invention. In the example illustrated in FIG. 4, a WDM optical signal includes wavelength channels λ1-λ3. Here, carrier wavelengths of the wavelength channels λ1-λ3 are different from each other. Each of the wavelength channels λ1-λ3 transmits a polarization multiplexed optical signal. Each polarization multiplexed optical signal transmits an X-polarization optical signal and a Y-polarization optical signal. In each of the wavelength channels, a polarization of the X-polarization optical signal and a polarization of the Y-polarization optical signal are orthogonal to each other.

In each of the wavelength channels, each of the X-polarization optical signal and the Y-polarization optical signal transmits a frame of a specified format. Thus, in each of the wavelength channels, fixed pattern regions for detecting the beginning of the frame are respectively inserted into the X-polarization optical signal and the Y-polarization optical signal. The fixed pattern region is inserted, for example, at specified time intervals. Alternatively, the fixed pattern region is added for a specified number of bits. In the example illustrated in FIG. 4, a fixed pattern P1 and a fixed pattern P2 are respectively added to an X-polarization optical signal and a Y-polarization optical signal in the wavelength channel λ1. Further, a fixed pattern P3 and a fixed pattern P4 are respectively added to an X-polarization optical signal and a Y-polarization optical signal in the wavelength channel λ2.

In each of the wavelength channels, a fixed pattern region of the X-polarization optical signal and a fixed pattern region of the Y-polarization optical signal are transmitted at the same time (simultaneously). For example, in the wavelength channel λ1, the fixed pattern P1 inserted into the X-polarization optical signal and the fixed pattern P2 inserted into the Y-polarization optical signal are transmitted at the same time. Further, in the wavelength channel λ2, the fixed pattern P3 inserted into the X-polarization optical signal and the fixed pattern P4 inserted into the Y-polarization optical signal are transmitted at the same time. Thus, during a period of time in which a fixed pattern region is transmitted, a single polarization state is generated in each of the wavelength channels.

In addition, in a WDM transmission according to the embodiments of the present invention, one or more pairs of wavelength channels are created from a plurality of wavelength channels multiplexed in a WDM optical signal. Each pair of wavelength channels (that is, a wavelength channel pair) is configured by two wavelength channels. In the example illustrated in FIG. 4, the wavelength channel λ1 and the wavelength channel λ2 configure a wavelength channel pair.

Two wavelength channels that configure a wavelength channel pair are synchronized with each other. In the following descriptions, "synchronized" refers to a state in which fixed patterns are transmitted at the same time. Thus, in the example illustrated in FIG. 4, the fixed patterns in the wavelength channel λ1 and the fixed patterns in the wavelength channel λ2 are transmitted at the same time. In other words, the fixed patterns P1-P4 are transmitted at the same time in a wavelength channel pair including the wavelength channels λ1 and λ2. Here, "at the same time" is not limited to being at exactly the same time, but it includes "at substantially the same time" or "at approximately the same time".

Four fixed patterns used in each wavelength channel pair (the fixed patterns P1-P4 in FIG. 4) have a specified relationship. Specifically, three out of the four fixed patterns have the same bit string. A value of each bit of the remaining one of the four fixed patterns is inverted with respect to a value of a corresponding bit of the other three fixed patterns.

Figure 5:
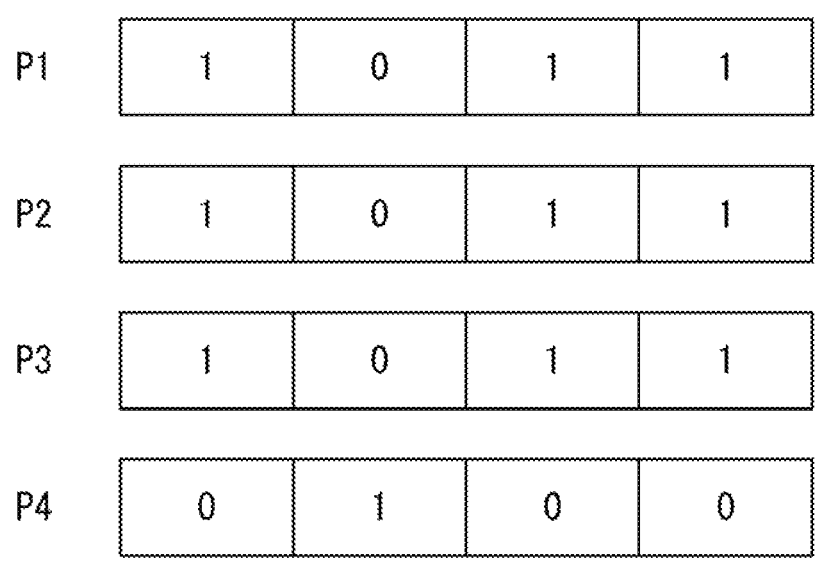

FIG. 5 illustrates examples of fixed patterns used in a wavelength channel pair. In this example, a bit length of a fixed pattern is 4 bits. However, the bit length of a fixed pattern is actually tens of bits to hundreds of bits. Further, in this example, the fixed patterns P1 and P2 are respectively inserted into the X-polarization optical signal and the Y-polarization optical signal of the wavelength channel λ1, and the fixed patterns P3 and P4 are respectively inserted into the X-polarization optical signal and the Y-polarization optical signal of the wavelength channel λ2.

The fixed patterns P1-P3 are the same as one another. A value of each bit of the fixed pattern P4 is inverted with respect to a value of a corresponding bit of the fixed pattern P3. Thus, in the wavelength channel λ1, the fixed patterns P1 and P2 whose respective values of each bit are the same are transmitted at the same time. On the other hand, in the wavelength channel λ2, the fixed pattern P3 and P4 whose respective values of each bit are inverted with respect to each other are transmitted at the same time.

FIGS. 6A-6C illustrate examples of a relationship between a fixed pattern transmitted by an optical signal and a polarization state. In this example, a fixed pattern is transmitted by BPSK (binary phase shift keying). BPSK transmits one bit of data in each symbol. Further, in this example, "1" is transmitted by "I=1, Q=1", as illustrated in FIG. 6A. Here, I and Q represent an electric field of an optical signal. In other words, "1" is transmitted when "phase=π/4". On the other hand, "0" is transmitted when "I=−1, Q=−1". In other words, "0" is transmitted when "phase=−3π/4". As described above, the phase of an optical signal when "1" is transmitted and the phase of an optical signal when "0" is transmitted are inverted with respect to each other.

FIG. 6B illustrates an example of a polarization state of a polarization multiplexed optical signal when a bit value transmitted by an X-polarization optical signal and a bit value transmitted by a Y-polarization optical signal are the same. In other words, FIG. 6B illustrates the polarization state of the polarization multiplexed optical signal when a phase of the X-polarization optical signal and a phase of the Y-polarization optical signal are the same. In this example, an X-polarization component is represented by a "positive value" when the X-polarization optical signal transmits "1:π/4", and a Y-polarization component is represented by a "positive value" when the Y-polarization optical signal transmits "1:π/4". Here, the polarization state of the polarization multiplexed optical signal is obtained by combining a polarization state of the X-polarization optical signal and a polarization state of the Y-polarization optical signal. Thus, a polarization of the polarization multiplexed optical signal is 45 degrees when the bit value transmitted by the X-polarization optical signal and the bit value transmitted by the Y-polarization optical signal are the same. It is assumed that an amplitude of the X-polarization optical signal and an amplitude of the Y-polarization optical signal are the same.

FIG. 6C illustrates an example of a polarization state of a polarization multiplexed optical signal when a bit value transmitted by an X-polarization optical signal and a bit value transmitted by a Y-polarization optical signal are inverted with respect to each other. In other words, FIG. 6C illustrates the polarization state of the polarization multiplexed optical signal when a phase of the X-polarization optical signal and a phase of the Y-polarization optical signal are inverted with respect to each other. In this example, it is assumed that the X-polarization optical signal transmits "1:π/4", and the Y-polarization optical signal transmits "0:−3π/4". In this case, a Y-polarization component is represented by a "negative value". Thus, a polarization of the polarization multiplexed optical signal is −45 degrees (or 135 degrees) when the bit value transmitted by the X-polarization optical signal and the bit value transmitted by the Y-polarization optical signal are inverted with respect to each other.

As described above, the polarization state of a polarization multiplexed optical signal is dependent on a combination of bit values transmitted by an X-polarization optical signal and a Y-polarization optical signal. In this example, a polarization of the polarization multiplexed optical signal is 45 degrees when the same bit value is transmitted by the X-polarization optical signal and the Y-polarization optical signal. Further, the polarization of the polarization multiplexed optical signal is −45 degrees (or 135 degrees) when bit values inverted with respect to each other are respectively transmitted by the X-polarization optical signal and the Y-polarization optical signal. Thus, in the examples illustrated in FIGS. 4 and 5, during a period of time in which the fixed patterns P1 and P2 are transmitted in the wavelength channel λ1, the polarization of the wavelength channel λ1 is 45 degrees. On the other hand, during a period of time in which the fixed patterns P3 and P4 are transmitted in the wavelength channel λ2, the polarization of the wavelength channel λ2 is −45 degrees (or 135 degrees).

In other words, during the period of time T1-T2, the polarization state of the wavelength channel λ1 is represented by the point B illustrated in FIG. 3A, and the polarization state of the wavelength channel λ2 is represented by the point E illustrated in FIG. 3B. Thus, when the wavelength channels λ1-λ3 illustrated in FIG. 4 are multiplexed, a polarization variation due to the wavelength channel λ1 in the wavelength channel λ3 and a polarization variation due to the wavelength channel λ2 in the wavelength channel λ3 are canceled out during the period of time T1-T2. In other words, the polarization variations due to the wavelength channels λ1 and λ2 in the wavelength channel λ3 (that is, in a disturbed channel) are canceled out or suppressed.

FIG. 7 illustrates an example of a WDM transmission system. In this example, the WDM transmission system includes WDM transmission devices 100 and 110. It is assumed that an optical signal is transmitted from the WDM transmission device 100 to the WDM transmission device 110 through an optical transmission link 120.

The WDM transmission device 100 includes a plurality of transmitter units 1 and an optical multiplexer 2. Each of the transmitter units 1 generates an optical signal that transmits data. Wavelengths of a plurality of optical signals generated by respective transmitter units 1 are different from one another. The optical multiplexer 2 combines optical signals generated by the transmitter units 1 so as to generate a WDM optical signal. This WDM optical signal is transmitted to the WDM transmission device 110 through the optical transmission link 120.

One or more relay nodes may be provided between the WDM transmission devices 100 and 110. The relay node can amplify a WDM optical signal. Further, a reconfigurable optical add-drop multiplexer (ROADM) may be provided in the relay node. The ROADM can drop a specified wavelength channel from a WDM optical signal, and can add an optical signal to an empty channel of a WDM optical signal.

The WDM transmission device 110 includes an optical demultiplexer 11 and a plurality of receiver units 12. The optical demultiplexer 11 separates a plurality of optical signals multiplexed in a WDM optical signal for each wavelength, and guides each obtained optical signal to a corresponding receiver unit 12. Each of the receiver units 12 recovers data from a received optical signal.

Figure 8:
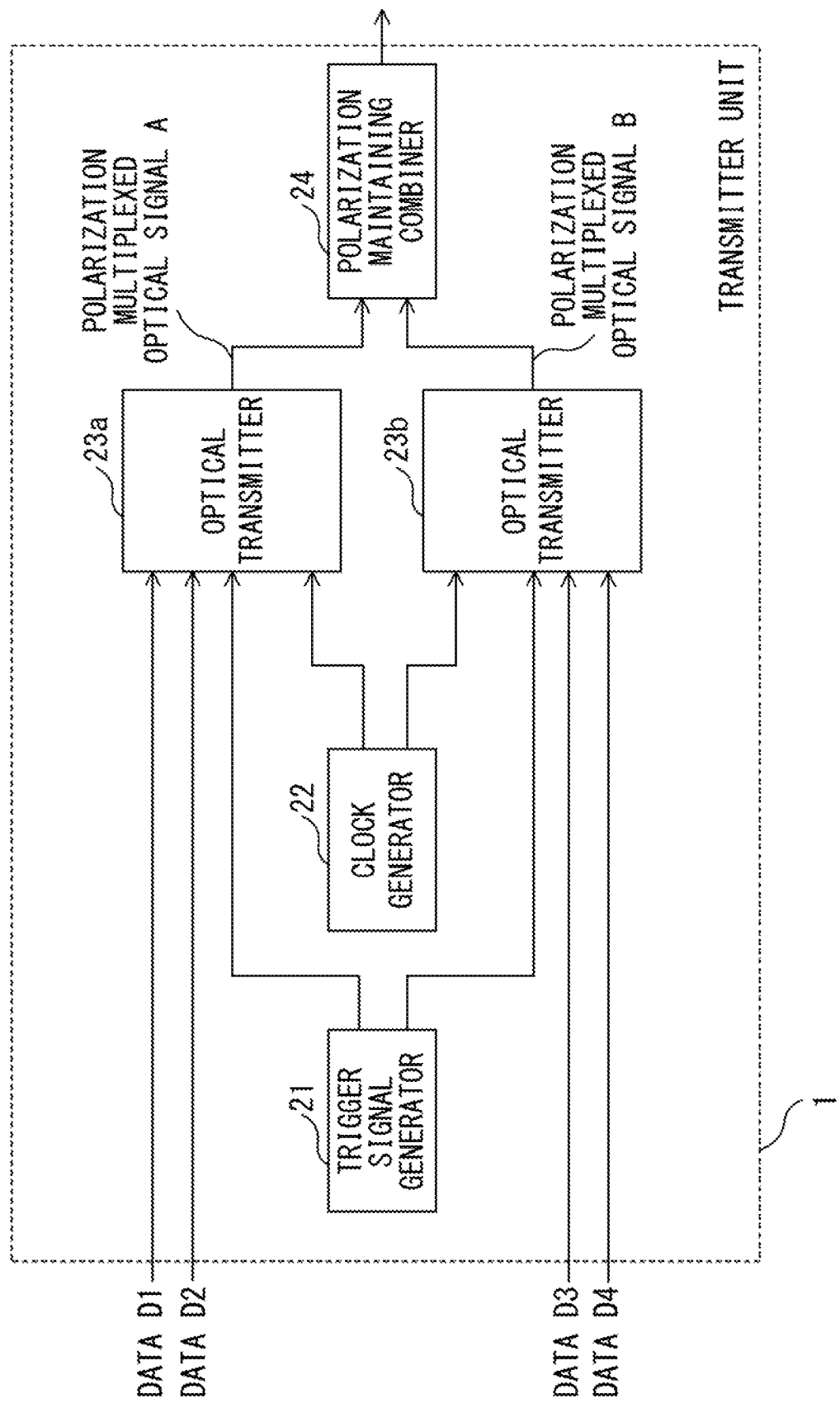
FIG. 8 illustrates an example of a transmitter unit.

FIG. 8 illustrates an example of the transmitter unit 1. As illustrated in FIG. 8, the transmitter unit 1 includes a trigger signal generator 21, a clock generator 22, optical transmitters 23a and 23b, and a polarization maintaining combiner 24. Further, data D1 to data D4 are input to the transmitter unit 1. The data D1 and the data D2 are guided to the optical transmitter 23a, and the data D3 and the data D4 are guided to the optical transmitter 23b.

The trigger signal generator 21 generates a trigger signal and provides it to the optical transmitters 23a and 23b. The trigger signal indicates a timing at which fixed patterns are inserted into the data D1 to the data D4. In this example, each fixed pattern is inserted into corresponding data at substantially the same time. In other words, the trigger signal is provided to the optical transmitters 23a and 23b at substantially the same time. Note that the trigger signal generator 21 generates a trigger signal, for example, at specified time intervals. This time interval is determined according to the length of a frame for transmitting data.

The clock generator 22 generates a clock signal. This clock signal is used to generate a modulated optical signal in the optical transmitters 23a and 23b.

Each of the optical transmitters 23a and 23b generates a polarization multiplexed optical signal that transmits data using a trigger signal and a clock signal. In other words, the optical transmitter 23a generates a polarization multiplexed optical signal A from a modulated optical signal that transmits the data D1 and a modulated optical signal that transmits the data D2. Likewise, the optical transmitter 23b generates a polarization multiplexed optical signal B from a modulated optical signal that transmits the data D3 and a modulated optical signal that transmits the data D4. The wavelength of the polarization multiplexed optical signal A and the wavelength of the polarization multiplexed optical signal B are different from each other.

The polarization maintaining combiner 24 combines the polarization multiplexed optical signal A generated by the optical transmitter 23a and the polarization multiplexed optical signal B generated by the optical transmitter 23b. Here, the polarization maintaining combiner 24 combines the polarization multiplexed optical signal A and the polarization multiplexed optical signal B such that the polarization state of the polarization multiplexed optical signal A and the polarization state of the polarization multiplexed optical signal B maintain a specified relationship. It is preferable that the optical transmitter 23a be connected to the polarization maintaining combiner 24 through a polarization maintaining fiber and the optical transmitter 23b be connected to the polarization maintaining combiner 24 through a polarization maintaining fiber.

Figure 9:
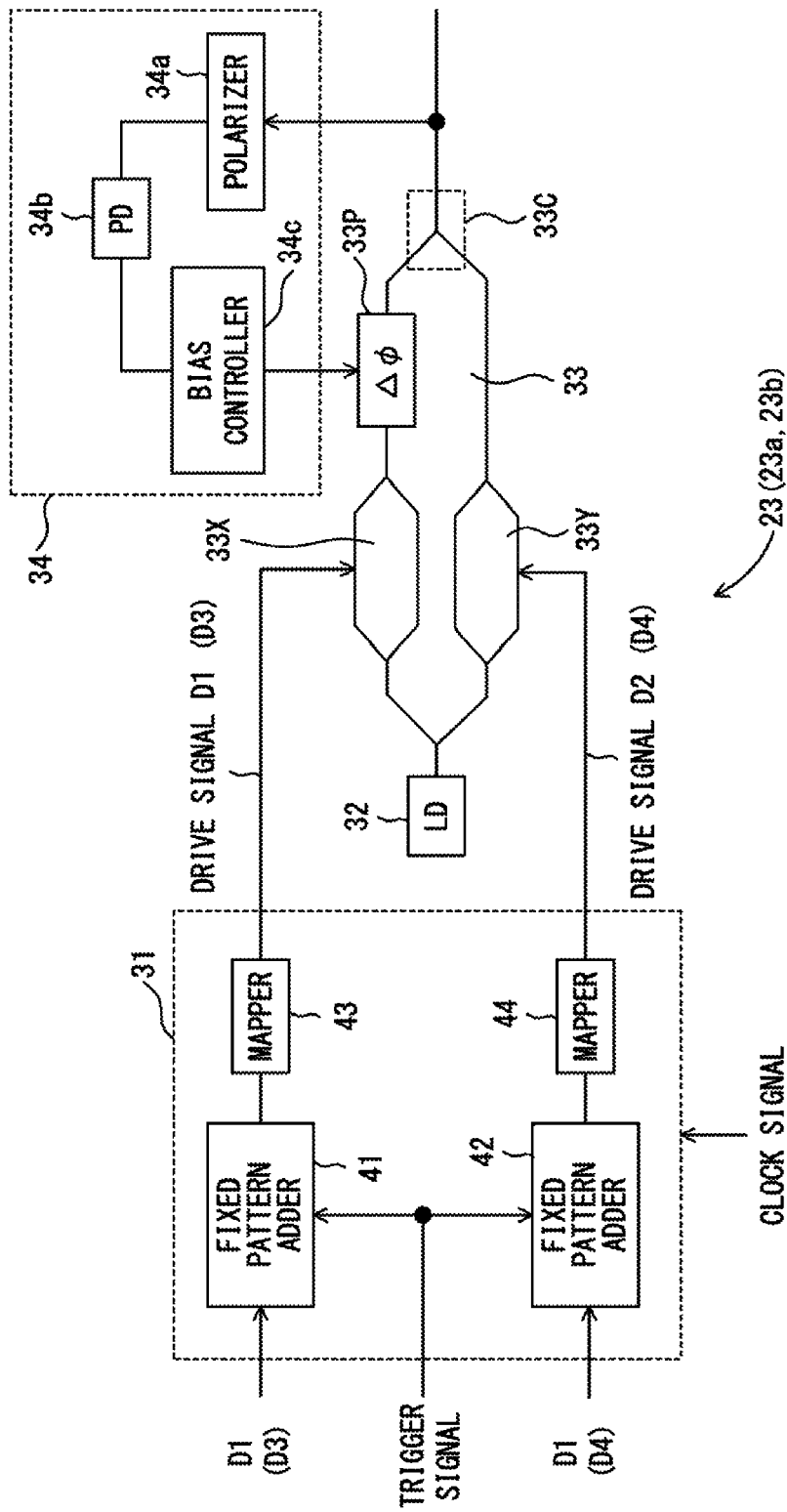
FIG. 9 illustrates an example of an optical transmitter that is implemented in the transmitter unit.

FIG. 9 illustrates an example of an optical transmitter that is implemented in the transmitter unit 1. Here, an optical transmitter 23 illustrated in FIG. 9 can be used as the optical transmitters 23a or 23b in the transmitter unit 1 illustrated in FIG. 8. An example in which the optical transmitter 23 is used as the optical transmitter 23a illustrated in FIG. 8 is described below.

The optical transmitter 23 includes a signal processing circuit 31, a laser light source 32, an optical modulator 33, and a phase control circuit 34. Data signals D1 and D2, a trigger signal, and a clock signal are input to the optical transmitter 23.

The signal processing circuit 31 includes fixed pattern adders 41 and 42, and mappers 43 and 44. The fixed pattern adders 41 and 42, and the mappers 43 and 44 operate according to a clock signal generated by the clock generator 22. The signal processing circuit 31 is implemented by, for example, a digital signal processor or a digital signal processing circuit. Further, the signal processing circuit 31 may have any other functions not illustrated in FIG. 9.

Each of the fixed pattern adders 41 and 42 inserts a fixed pattern into an input bit string when a trigger signal is input. Specifically, the fixed pattern adder 41 adds the fixed pattern P1 illustrated in FIG. 5 to the data D1. The fixed pattern adder 42 adds the fixed pattern P2 illustrated in FIG. 5 to the data D2. In other words, the fixed patterns P1 and P2 that are the same as each other are respectively added to the data D1 and the data D2 at substantially the same time.

The mapper 43 maps, by a specified modulation scheme, the data D1 to which the fixed pattern P1 is added, so as to generate a drive signal D1. Likewise, the mapper 44 maps, by the specified modulation scheme, the data D2 to which the fixed pattern P2 is added, so as to generate a drive signal D2. In this example, each of the fixed patterns P1 and P2 is mapped by BPSK. In this example, each drive signal represents electric field information that indicates a phase and an amplitude of a modulated optical signal. In other words, each drive signal includes an I-component signal and a Q-component signal.

The laser light source 32 generates continuous wave light of a specified wavelength. For example, when the optical transmitter 23 is used as the optical transmitter 23a illustrated in FIG. 8, the laser light source 32 generates continuous wave light of a wavelength λ1. When the optical transmitter 23 is used as the optical transmitter 23b illustrated in FIG. 8, the laser light source 32 generates continuous wave light of a wavelength λ2.

The optical modulator 33 includes an optical modulator 33X, an optical modulator 33Y, a phase shifter 33P, and a polarization beam combiner 33C. Continuous wave light generated by the laser light source 32 is split and guided to the optical modulator 33X and the optical modulator 33Y. Here, a power of continuous wave light guided to the optical modulator 33X and a power of continuous wave light guided to the optical modulator 33Y are substantially the same.

The optical modulator 33X modulates the continuous wave light with the drive signal D1 generated by the signal processing circuit 31 so as to generate a modulated optical signal X. Likewise, the optical modulator 33Y modulates the continuous wave light with the drive signal D2 generated by the signal processing circuit 31 so as to generate a modulated optical signal Y. The phase shifter 33P adjusts a phase of the modulated optical signal X or the modulated optical signal Y in order to match the phases of the modulated optical signal X and the modulated optical signal Y. In the example illustrated in FIG. 9, the phase shifter 33P adjusts the phase of the modulated optical signal X. The phase shifter 33P is realized by, for example, an electrode formed near an optical waveguide that propagates the modulated optical signal X. In this case, an optical path length of the optical waveguide varies due to an applied voltage of the electrode. As a result, the phase of the modulated optical signal X is adjusted. In this example, the applied voltage of the phase shifter 33P is controlled by the phase control circuit 34 which will be described later.

The polarization beam combiner 33C combines the modulated optical signal X and the modulated optical signal Y such that a polarization of the modulated optical signal X and a polarization of the modulated optical signal Y are orthogonal to each other. Here, it is assumed that polarization axes (an X-polarization axis and a Y-polarization axis) of the transmitter unit 1 are determined in advance. The X-polarization axis and the Y-polarization axis are orthogonal to each other. In the following descriptions, an X-polarization axis and a Y-polarization axis may be referred to as a "0-degree direction" and a "90-degree direction", respectively. The polarization beam combiner 33C combines the modulated optical signal X and the modulated optical signal Y such that a polarization of the modulated optical signal X matches the X-polarization axis and a polarization of the modulated optical signal Y matches the Y-polarization axis. As a result, a polarization multiplexed optical signal is generated.

The phase control circuit 34 includes a polarizer 34a, a photo detector (PD) 34b, and a bias controller 34c. The phase control circuit 34 controls an applied voltage of the phase shifter 33P such that the phase of the modulated optical signal X and the phase of the modulated optical signal Y match each other when the drive signal D1 and the drive signal D2 are the same as each other. Here, the polarization of the modulated optical signal X is 0 degrees, and the polarization of the modulated optical signal Y is 90 degrees. Thus, when the phase of the modulated optical signal X and the phase of the modulated optical signal Y match each other, the polarization multiplexed optical signal is a linear polarization at 45 degrees. In other words, when the polarization multiplexed optical signal is a linear polarization at 45 degrees, the phase of the modulated optical signal X and the phase of the modulated optical signal Y match each other.

Thus, the polarizer 34a is implemented sloping at 45 degrees with respect to the X-polarization axis. Then, a polarization multiplexed optical signal output from the optical modulator 33 is guided to the polarizer 34a. The photo detector 34b converts output light of the polarizer 34a into an electric signal. This electric signal indicates a 45-degree direction component of the polarization multiplexed optical signal output from the optical modulator 33. The bias controller 34c controls the applied voltage of the phase shifter 33P such that an amplitude or a power of an output signal of the photo detector 34b is maximized. In other words, a feedback control is performed such that the polarization multiplexed optical signal output from the optical modulator 33 is in a state closer to a linear polarization at 45 degrees, so as to determine the applied voltage of the phase shifter 33P.

The applied voltage of the phase shifter 33P is determined, for example, in an initial setting sequence that is performed before an actual data communication. In the initial setting sequence, the same drive signal is provided to the optical modulators 33X and 33Y. Each of the drive signals is, for example, a BPSK signal. An I component and a Q component of each of the drive signals are the same as each other. A polarization multiplexed signal is generated based on these drive signals.

In the initial setting sequence, the polarization multiplexed optical signal generated from the drive signals described above is guided to the phase control circuit 34. Then, the bias controller 34c controls the applied voltage of the phase shifter 33P such that an amplitude or a power of an output signal of the photo detector 34b is maximized. This results in optimizing the phase shifter 33P. In other words, when the drive signal D1 and the drive signal D2 are the same as each other (that is, when the phase of the modulated optical signal X and the phase of the modulated optical signal Y match each other), the polarization multiplexed optical signal is a linear polarization at 45 degrees, as illustrated in FIG. 6B. On the other hand, when the phase of the modulated optical signal X and the phase of the optical signal Y are inverted with respect to each other, the polarization multiplexed optical signal is a linear polarization at −45 degrees, as illustrated in FIG. 6C. After the initial setting sequence is completed, the applied voltage of the phase shifter 33P is maintained.

In the optical transmitter 23 described above, the modulated optical signal X and the modulated optical signal Y are combined according to the X-polarization axis and the Y-polarization axis of the transmitter unit 1. As an example, in the optical transmitter 23a, the optical modulator 33 is configured such that a polarization state of the modulated optical signal X and a polarization of the modulated optical signal Y are respectively "0 degrees" and "90 degrees" when the drive signals D1 and D2 are the same (that is, when the phases of the modulated optical signal X and the modulated optical signal Y match each other). Likewise, in the optical transmitter 23*b*, the optical modulator 33 is configured such that a polarization state of the modulated optical signal X and a polarization of the modulated optical signal Y are respectively "0 degrees" and "90 degrees" when the drive signals D3 and D4 are the same (that is, when the phases of the modulated optical signal X and the modulated optical signal Y match each other). As described above, in the transmitter unit 1, the optical modulator 33 of the optical transmitter 23*a*, the optical modulator 33 of the optical transmitter 23*b*, and the polarization maintaining combiner 24 are configured such that, when the drive signals D1 and D2 are the same and the drive signals D3 and D4 are the same, a polarization state of the modulated optical signal X of the optical transmitter 23*a* and a polarization state of the modulated optical signal X of the optical transmitter 23*b* substantially match each other and a polarization state of the modulated optical signal Y of the optical transmitter 23*a* and a polarization state of the modulated optical signal Y of the optical transmitter 23*b* substantially match each other.

Next, an operation of the transmitter unit 1 illustrated in FIG. 8 is described. In the following descriptions, it is assumed that the polarization multiplexed optical signal A generated by the optical transmitter 23*a* is transmitted through the wavelength channel $\lambda1$ and the polarization multiplexed optical signal B generated by the optical transmitter 23*b* is transmitted through the wavelength channel $\lambda2$.

In the optical transmitter 23*a*, the data D1 and the data D2 are input to the signal processing circuit 31. Then, the fixed pattern adder 41 adds the fixed pattern P1 to the data D1, and the fixed pattern adder 42 adds the fixed pattern P2 to the data D2. Here, as illustrated in FIG. 5, a value of each bit of the fixed pattern P1 and a value of a corresponding bit of the fixed pattern P2 are the same as each other. Further, the optical modulator 33 is adjusted such that the phase of the modulated optical signal X and the phase of the modulated optical signal Y match each other when a bit provided to the optical modulator 33X and a bit provided to the optical modulator 33Y are the same. Thus, the phase of the modulated optical signal X and the phase of the modulated optical signal Y match each other when the fixed patterns P1 and P2 are transmitted. In other words, the wavelength channel $\lambda1$ is linearly polarized at 45 degrees when the fixed patterns P1 and P2 are transmitted.

In the optical transmitter 23*b*, the data D3 and the data D4 are input to the signal processing circuit 31. Then, the fixed pattern adder 41 adds the fixed pattern P3 to the data D3, and the fixed pattern adder 42 adds the fixed pattern P4 to the data D4. Here, as illustrated in FIG. 5, a value of each bit of the fixed pattern P4 is inverted with respect to a value of a corresponding bit of the fixed pattern P3. Thus, the phase of the modulated optical signal X and the phase of the modulated optical signal Y are inverted with respect to each other when the fixed patterns P3 and P4 are transmitted. In other words, the wavelength channel $\lambda2$ is linearly polarized at −45 degrees when the fixed patterns P3 and P4 are transmitted.

A trigger signal generated by the trigger signal generator 21 is provided to the optical transmitters 23*a* and 23*b* at substantially the same time. Further, the optical transmitters 23*a* and 23*b* operate according to a clock signal generated by the clock generator 22. Thus, the timing at which the fixed patterns P3 and P4 are respectively added to the data D3 and the data D4 in the optical transmitter 23*b* is substantially the same as the timing at which the fixed patterns P1 and P2 are respectively added to the data D1 and the data D2 in the optical transmitter 23*a*. In other words, the fixed patterns P1-P4 are transmitted at the same time.

An optical signal of the wavelength channel $\lambda1$ that is generated by the optical transmitter 23*a* and an optical signal of the wavelength channel $\lambda2$ that is generated by the optical transmitter 23*b* are combined by the polarization maintaining combiner 24. Here, as described above, the fixed patterns P1-P4 are transmitted at the same time. Further, the wavelength channel $\lambda1$ is linearly polarized at 45 degrees, and the wavelength channel $\lambda2$ is linearly polarized at −45 degrees. Thus, as described with reference to FIGS. 3A and 3B, during a period of time in which the fixed patterns P1-P4 are transmitted, a polarization variation due to the wavelength channel $\lambda1$ and a polarization variation due to the wavelength channel $\lambda2$ are canceled out in an adjacent channel (that is, a disturbed channel) In other words, polarizations of the other wavelength channels in a WDM optical signal are not greatly disturbed due to the fixed patterns of the wavelength channels $\lambda1$ and $\lambda2$, which results in suppressing a bit error.

The transmitter unit 1 includes two optical transmitters 23 (23*a*, 23*b*). Here, the signal processing circuit 31 is implemented by, for example, a digital signal processor. In this case, the signal processing circuit 31 of the optical transmitter 23*a* and the signal processing circuit 31 of the optical transmitter 23*b* may be implemented using one digital signal processor.

Further, a Nyquist filter may be implemented by a digital signal processor in order to suppress a crosstalk between an optical signal generated by the optical transmitter 23*a* and an optical signal generated by the optical transmitter 23*b*. In this case, for example, Nyquist filter processing is performed on output signals of the mappers 43 and 44 in the signal processing circuit 31.

Further, in the example described above, a value of each bit of the fixed pattern P4 transmitted in one of the polarization components of the wavelength channel $\lambda2$ is inverted with respect to that of a general fixed pattern. Thus, an optical receiver is configured to establish a frame synchronization by detecting a fixed pattern or a pattern obtained by inverting the fixed pattern.

Other Embodiment 1

As described above, the optical transmitters 23*a* and 23*b* is requested to transmit the fixed patterns P1-P4 at the same time. In this case, a trigger signal generated by the trigger signal generator 21 needs to arrive at the optical transmitters 23*a* and 23*b* at the same time, and a clock signal generated by the clock generator 22 needs to arrive at the optical transmitters 23*a* and 23*b* at the same time. These conditions are satisfied, for example, when the length of a signal line from the trigger signal generator 21 to the optical transmitter 23*a* and the length of a signal line from the trigger signal generator 21 to the optical transmitter 23*b* are the same as each other, and when the length of a signal line from the clock generator 22 to the optical transmitter 23*a* and the length of a signal line from the clock generator 22 to the optical transmitter 23*b* are the same as each other.

However, depending on a layout in the transmitter unit 1, a signal line will not be allowed to be formed on a desired route. Thus, the transmitter unit according to another embodiment has a function to adjust a timing of a signal using a delay circuit.

Figure 10:
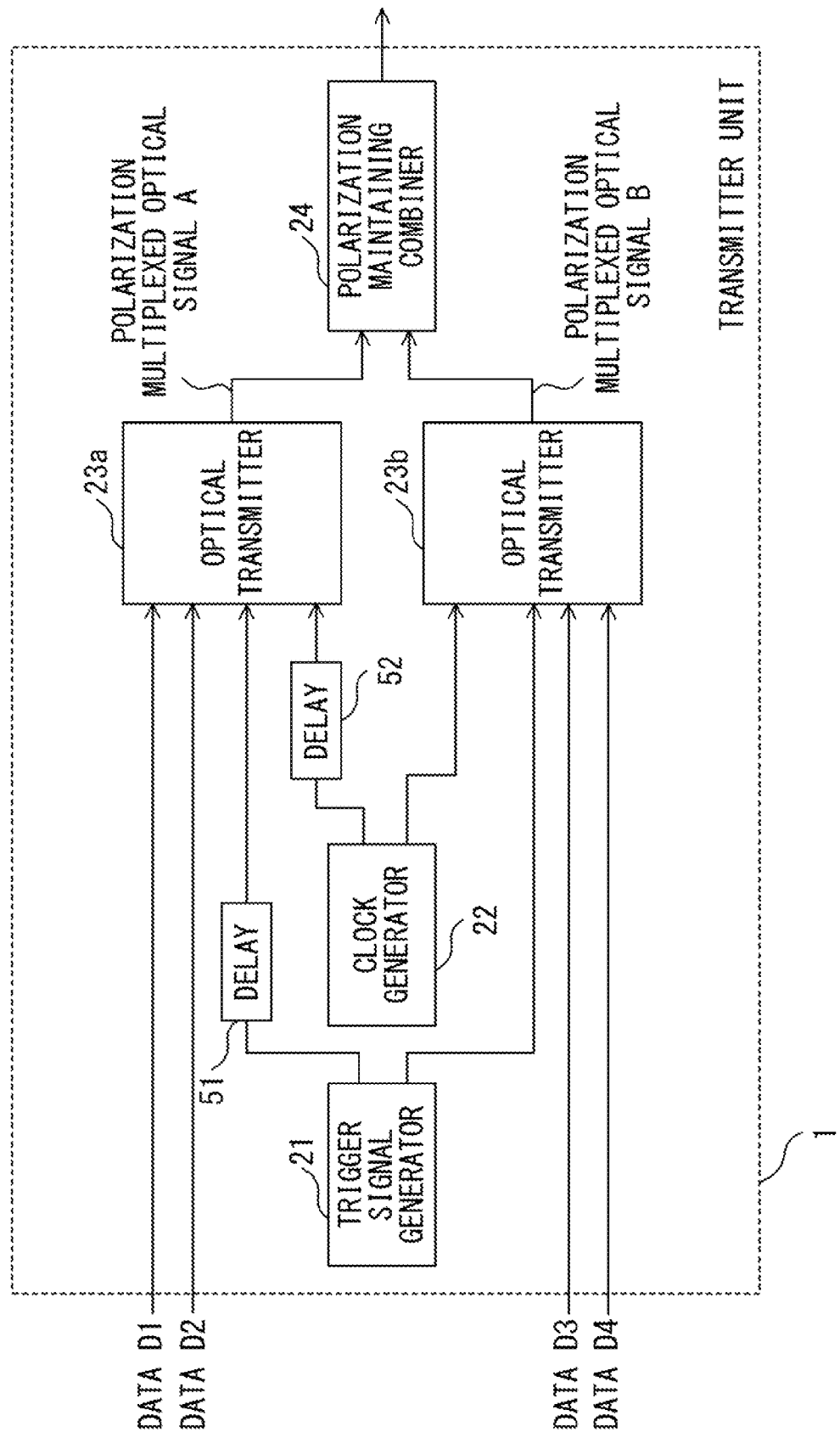
FIG. 10 illustrates an example of the transmitter unit according to another embodiment.

FIG. 10 illustrates an example of the transmitter unit according to another embodiment of the present invention.

As illustrated in FIG. 10, the transmitter unit according to the other embodiment includes delay circuits 51 and 52 in addition to the configuration illustrated in FIG. 8. The delay circuit 51 adjusts the time to propagate a trigger signal from the trigger signal generator 21 to the optical transmitter 23a. The delay circuit 52 adjusts the time to propagate a clock signal from the clock generator 22 to the optical transmitter 23a.

The delay times of the delay circuits 51 and 52 are adjusted with a feedback control in an initial setting sequence. In this case, the delay time of the delay circuit 51 is adjusted by monitoring a trigger signal that arrives at the optical transmitters 23a and 23b, and the delay time of the delay circuit 52 is adjusted by monitoring a clock signal that arrives at the optical transmitters 23a and 23b. Alternatively, the delay circuits 51 and 52 may be controlled based on an output optical signal of the polarization maintaining combiner 24.

Other Embodiment 2

In the example illustrated in FIGS. 8 and 9, the optical transmitters 23a and 23b operate such that the fixed patterns in the wavelength channel λ1 and the fixed patterns in the wavelength channel λ2 are transmitted at the same time at an output end of the transmitter unit 1. However, depending on a configuration of the WDM transmission system, it may be preferable that the fixed patterns in the wavelength channel λ1 and the fixed patterns in the wavelength channel λ2 be transmitted at different timings at the output end of the transmitter unit 1.

Figure 11:
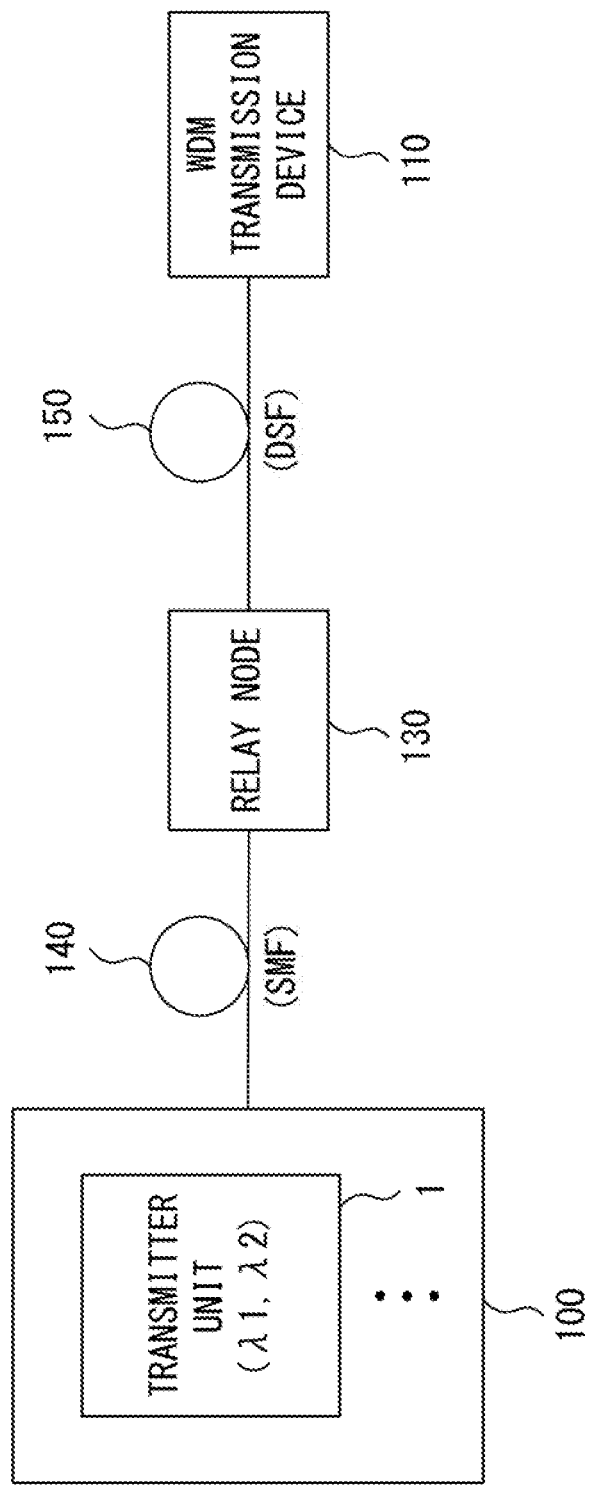
FIG. 11 illustrates another example of the WDM transmission system.

FIG. 11 illustrates another example of the WDM transmission system. In the example illustrated in FIG. 11, a relay node 130 is provided between the WDM transmission devices 100 and 110. The WDM transmission device 100 and the relay node 130 are connected by a single mode fiber (SMF) 140. The connection using an SMF is just an example, and the WDM transmission device 100 and the relay node 130 may be connected by another type of optical fiber whose chromatic dispersion is greater than a specified threshold. The relay node 130 and the WDM transmission device 110 are connected by a dispersion-shifted fiber (DSF) 150.

A chromatic dispersion in a SMF is large. Thus, an XPM is small in the SMF 140. In other words, a polarization variation due to an XPM is small. On the other hand, achromatic dispersion in a DSF is zero or approximately zero. Thus, an XPM is large in the DSF 150. In other words, a polarization variation due to an XPM is large in the DSF 150.

Thus, the transmitter unit 1 generates optical signals of the wavelength channels λ1 and λ2 such that the fixed patterns P1 and P2 in the wavelength channel λ1 and the fixed patterns P3 and P4 in the wavelength channel λ2 are transmitted at the same time in the DSF 150. Here, the relay node 130 includes an optical amplifier, so a power of an optical signal is high at an input end of the DSF 150. Further, an XPM is larger if the power of an optical signal is higher. Thus, it is preferable that the fixed patterns P1 and P2 in the wavelength channel λ1 and the fixed patterns P3 and P4 in the wavelength channel λ2 be transmitted at the same time at the input end of the DSF 150.

It is assumed that the transmitter unit 1 includes the delay circuit 51 illustrated in FIG. 10. The delay time of the delay circuit 51 is designed based on the characteristics and the length of the SMF 140. For example, it is assumed that the chromatic dispersion of the SMF 140 is 17 ps/nm/km and the length of the SMF 140 is 500 km. It is also assumed that a wavelength difference between the wavelength channels λ1 and λ2 is 1 nm.

In this case, a difference in propagation time between the wavelength channels λ1 and λ2 in the SMF 140 is 8.5 ns. Thus, the delay time of the delay circuit 51 is adjusted to 8.5 ns. Then, the fixed patterns P3 and P4 in the wavelength channel λ2 is shifted by 8.5 ns at a transmission end of the transmitter unit 1 with respect to the fixed patterns P1 and P2 in the wavelength channel λ1. As a result, the fixed patterns P1 and P2 in the wavelength channel λ1 and the fixed patterns P3 and P4 in the wavelength channel λ2 are transmitted at the same time at the input end of the DSF 150. In other words, the effect of the wavelength channel λ1 and the effect of the wavelength channel λ2 are canceled out at a region where a polarization variation due to an XPM is largest, which results in improving a quality of each wavelength channel in a WDM optical signal.

Other Embodiment 3

In the example described above, a fixed pattern is transmitted by BPSK. However, the embodiments of the present invention are not limited to this configuration. In other words, the fixed pattern may be transmitted by a modulation scheme other than BPSK. For example, the transmitter unit 1 may transmit the fixed pattern by, for example, QPSK, 8PSK, 8QAM, 16QAM, or 64QAM.

Figure 12:
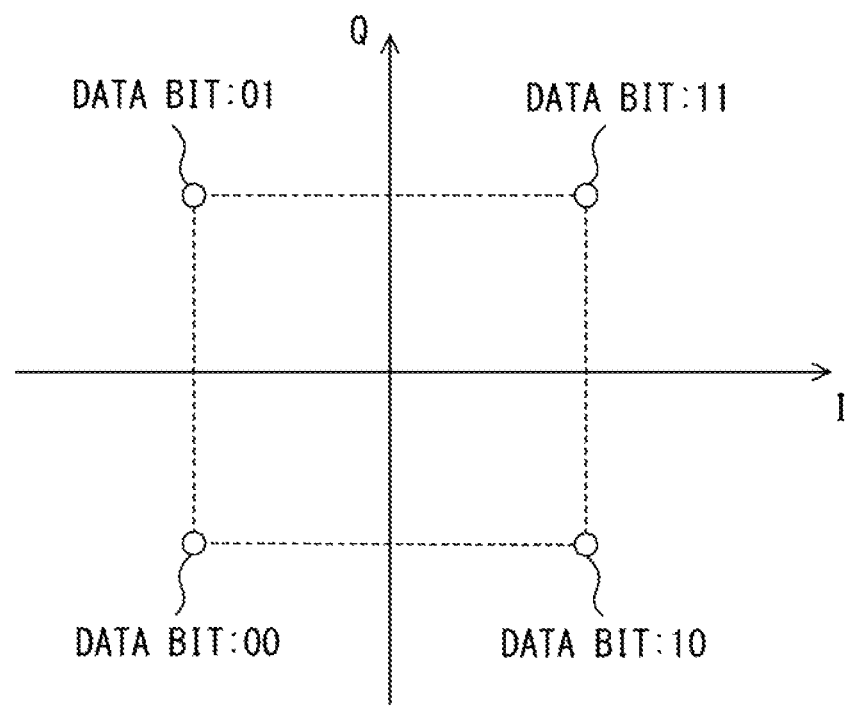
FIG. 12 illustrates an example of a mapping pattern for QPSK.

QPSK transmits two bits in each symbol. In the optical transmitter 23b, mapping for the fixed pattern is performed such that a phase of each symbol of the fixed pattern P3 and a phase of a corresponding symbol of the fixed pattern P4 are inverted with respect to each other. As an example, it is assumed that a mapping pattern illustrated in FIG. 12 is used for QPSK. A first symbol of the fixed patterns P3 and P4 are respectively "10" and "01", and a second symbol of the fixed patterns P3 and P4 are respectively "11" and "00" in the example illustrated in FIG. 5. In this case, the phases of a first symbol of the fixed patterns P3 and P4 are −45 degrees and 135 degrees, respectively. In other words, the phases of the first symbol of the fixed patterns P3 and P4 are inverted with respect to each other. The phases of a second symbol of the fixed patterns P3 and P4 are 45 degrees and −135 degrees, respectively. In other words, the phases of the second symbol of the fixed patterns P3 and P4 are also inverted with respect to each other. Thus, even if the fixed patterns P1-P4 are transmitted by QPSK, the effects that the wavelength channels λ1 and λ2 have on a disturbed channel are canceled out.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmission device that is used in a wavelength division multiplexing optical transmission system, the optical transmission device comprising:
   a signal processing circuit configured to generate a first drive signal to which a first fixed pattern is added, a second drive signal to which a second fixed pattern is added, a third drive signal to which a third fixed pattern is added, and a fourth drive signal to which a fourth fixed pattern is added;
a first optical modulator configured to generate a first optical signal based on the first drive signal, generate a second optical signal based on the second drive signal, and combine the first optical signal and the second optical signal so as to generate a first polarization multiplexed optical signal of a first wavelength;
a second optical modulator configured to generate a third optical signal based on the third drive signal, generate a fourth optical signal based on the fourth drive signal, and combine the third optical signal and the fourth optical signal so as to generate a second polarization multiplexed optical signal of a second wavelength; and
a combiner configured to combine the first polarization multiplexed optical signal and the second polarization multiplexed optical signal, wherein
the first fixed pattern and the second fixed pattern are determined such that a phase of the first optical signal generated based on the first fixed pattern matches or approximately matches a phase of the second optical signal generated based on the second fixed pattern,
the third fixed pattern and the fourth fixed pattern are determined such that a phase of the third optical signal generated based on the third fixed pattern is inverted or approximately inverted with respect to a phase of the fourth optical signal generated based on the fourth fixed pattern, and
the signal processing circuit generates the first drive signal, the second drive signal, the third drive signal, and the fourth drive signal such that the first fixed pattern, the second fixed pattern, the third fixed pattern, and the fourth fixed pattern are transmitted at the same or approximately the same time by the first polarization multiplexed optical signal and the second polarization multiplexed optical signal.

2. The optical transmission device according to claim 1, wherein
the signal processing circuit includes a first drive signal generating circuit that generates the first drive signal, a second drive signal generating circuit that generates the second drive signal, a third drive signal generating circuit that generates the third drive signal, and a fourth drive signal generating circuit that generates the fourth drive signal.

3. The optical transmission device according to claim 1, wherein
the first fixed pattern, the second fixed pattern, and the third fixed pattern are the same as one another, and
a value of each bit of the fourth fixed pattern is inverted with respect to a value of a corresponding bit of the third fixed pattern.

4. The optical transmission device according to claim 1, wherein
the first optical modulator is adjusted such that the phase of the first optical signal approximately matches the phase of the second optical signal when the first drive signal and the second drive signal are substantially the same as each other, and
the second optical modulator is adjusted such that the phase of the third optical signal approximately matches the phase of the fourth optical signal when the third drive signal and the fourth drive signal are substantially the same as each other.

5. The optical transmission device according to claim 4, wherein
the first optical modulator, the second optical modulator, and the combiner are configured such that, when the phase of the first optical signal approximately matches the phase of the second optical signal and when the phase of the third optical signal approximately matches the phase of the fourth optical signal, a polarization state of the first optical signal substantially matches a polarization state of the third optical signal and a polarization state of the second optical signal substantially matches a polarization state of the fourth optical signal.

6. The optical transmission device according to claim 1, wherein
the signal processing circuit generates the first drive signal, the second drive signal, the third drive signal, and the fourth drive signal such that the first fixed pattern, the second fixed pattern, the third fixed pattern, and the fourth fixed pattern are output from the optical transmission device at the same or approximately the same time by the first polarization multiplexed optical signal and the second polarization multiplexed optical signal.

7. The optical transmission device according to claim 1, wherein
a relay node is provided between the optical transmission device and an optical receiver that receives an optical signal output from the optical transmission device, and
the signal processing circuit generates the first drive signal, the second drive signal, the third drive signal, and the fourth drive signal such that the first fixed pattern, the second fixed pattern, the third fixed pattern, and the fourth fixed pattern are output from the relay node at the same or approximately the same time by the first polarization multiplexed optical signal and the second polarization multiplexed optical signal.

8. The optical transmission device according to claim 7, wherein
the optical transmission device and the relay node are connected by an optical fiber whose chromatic dispersion is greater than a specified threshold, and
the relay node and the optical receiver are connected by a dispersion-shifted fiber whose chromatic dispersion is zero or approximately zero.

9. A wavelength division multiplexing optical transmission device comprising:
a plurality of optical transmission devices configured to generate optical signals of different wavelengths; and
a multiplexer configured to combine the optical signals generated by the plurality of optical transmission devices, wherein
each of the plurality of optical transmission devices includes
a signal processing circuit configured to generate a first drive signal to which a first fixed pattern is added, a second drive signal to which a second fixed pattern is added, a third drive signal to which a third fixed pattern is added, and a fourth drive signal to which a fourth fixed pattern is added;
a first optical modulator configured to generate a first optical signal based on the first drive signal, generate a second optical signal based on the second drive signal, and combine the first optical signal and the second optical signal so as to generate a first polarization multiplexed optical signal of a first wavelength;

a second optical modulator configured to generate a third optical signal based on the third drive signal, generate a fourth optical signal based on the fourth drive signal, and combine the third optical signal and the fourth optical signal so as to generate a second polarization multiplexed optical signal of a second wavelength; and a combiner configured to combine the first polarization multiplexed optical signal and the second polarization multiplexed optical signal, wherein in each of the plurality of optical transmission devices, the first fixed pattern and the second fixed pattern are determined such that a phase of the first optical signal generated based on the first fixed pattern matches or approximately matches a phase of the second optical signal generated based on the second fixed pattern, the third fixed pattern and the fourth fixed pattern are determined such that a phase of the third optical signal generated based on the third fixed pattern is inverted or approximately inverted with respect to a phase of the fourth optical signal generated based on the fourth fixed pattern, and the signal processing circuit generates the first drive signal, the second drive signal, the third drive signal, and the fourth drive signal such that the first fixed pattern, the second fixed pattern, the third fixed pattern, and the fourth fixed pattern are transmitted at the same or approximately the same time by the first polarization multiplexed optical signal and the second polarization multiplexed optical signal.

* * * * *